Nov. 27, 1928.

E. E. CLEMENT

INTERNAL COMBUSTION ENGINE

Filed Oct. 7, 1921      14 Sheets-Sheet 1

Inventor
Edward E. Clement

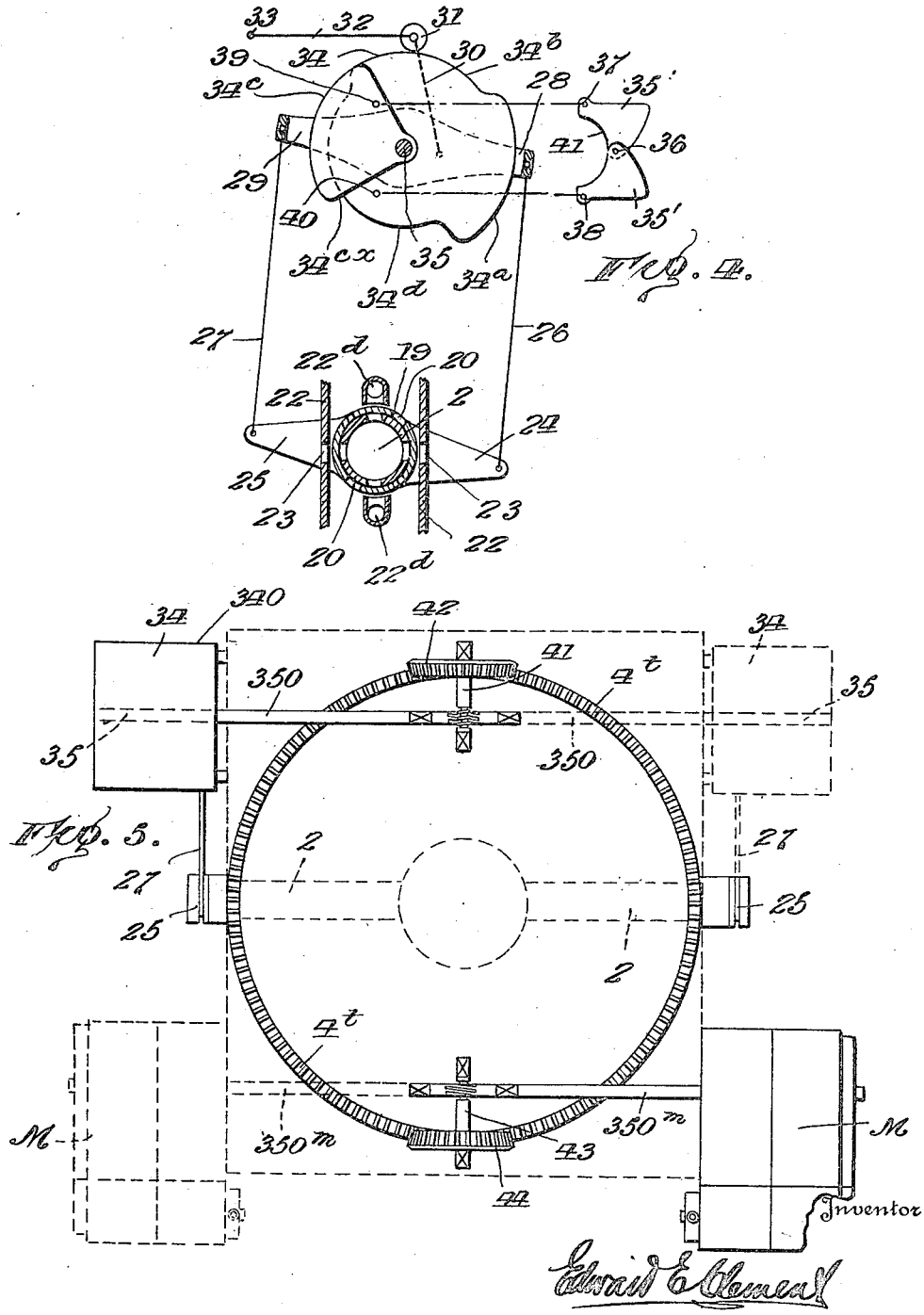

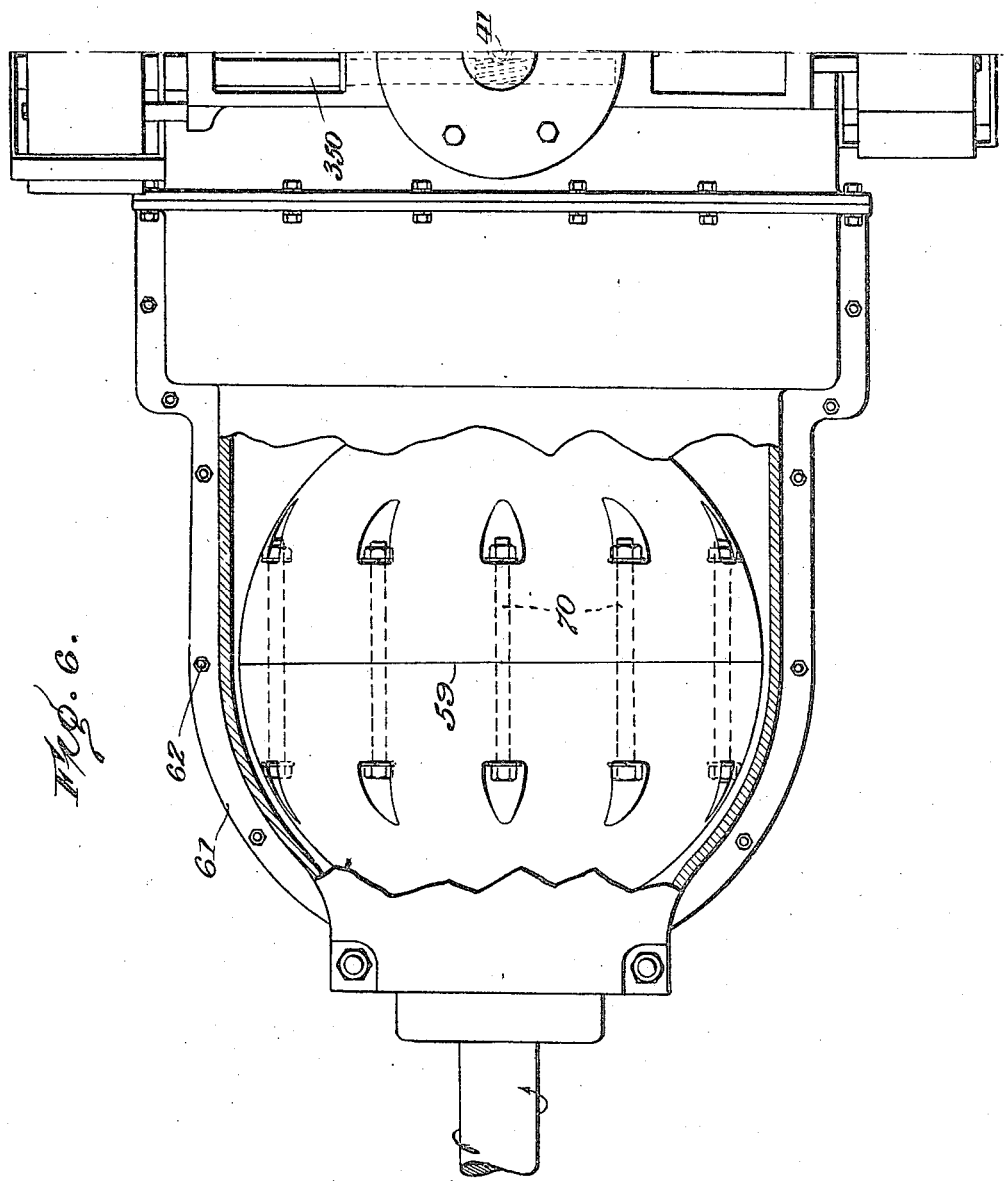

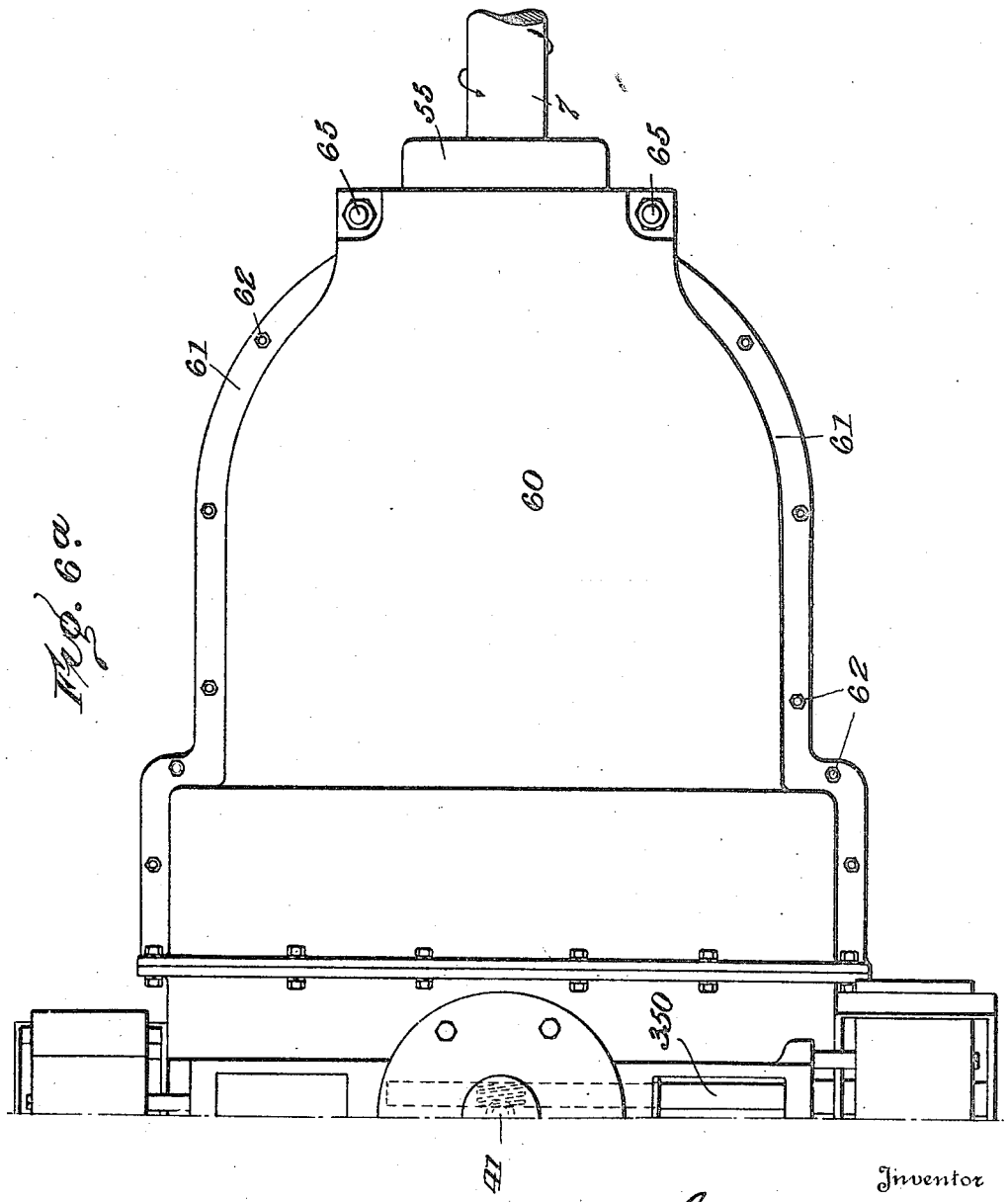

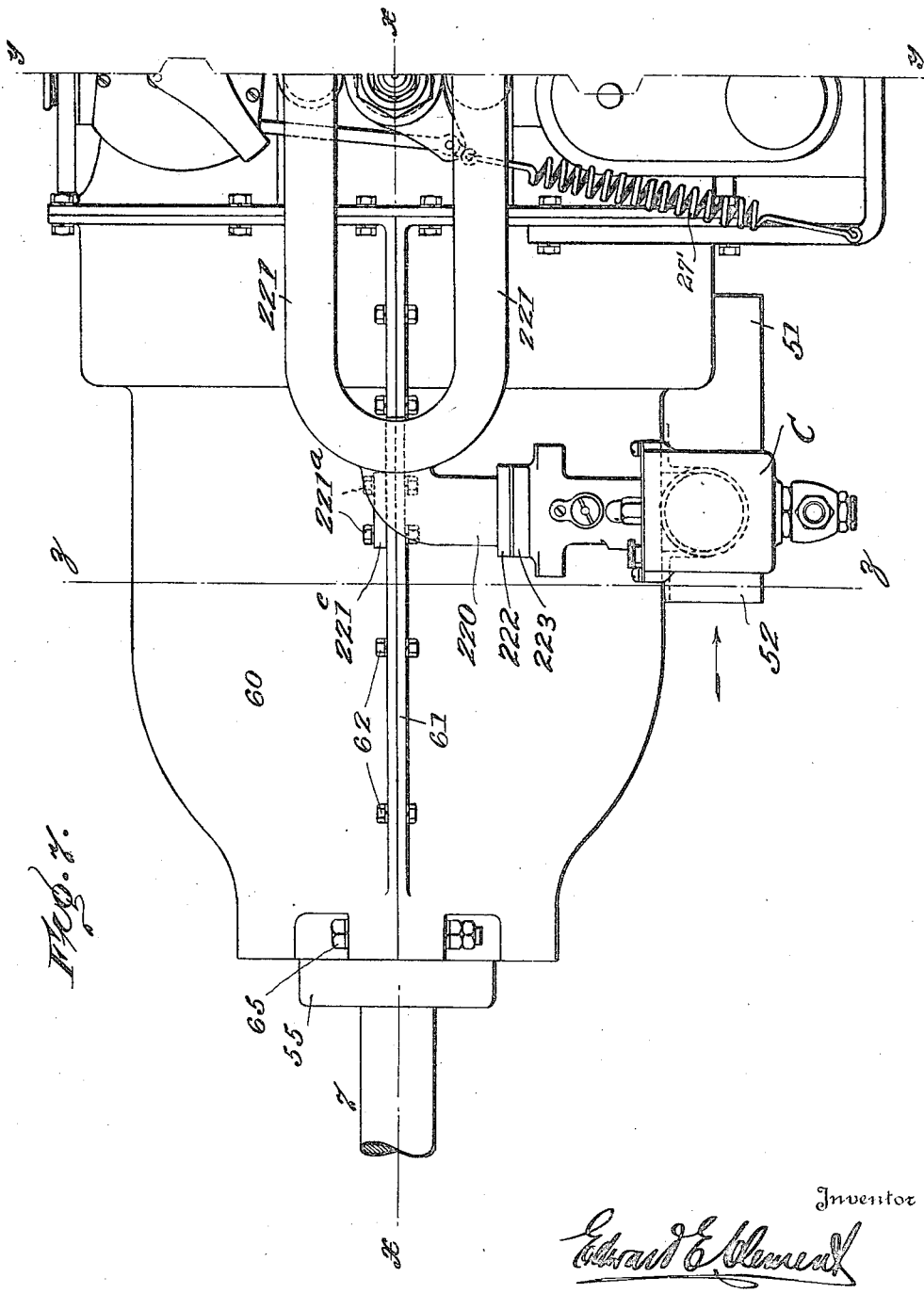

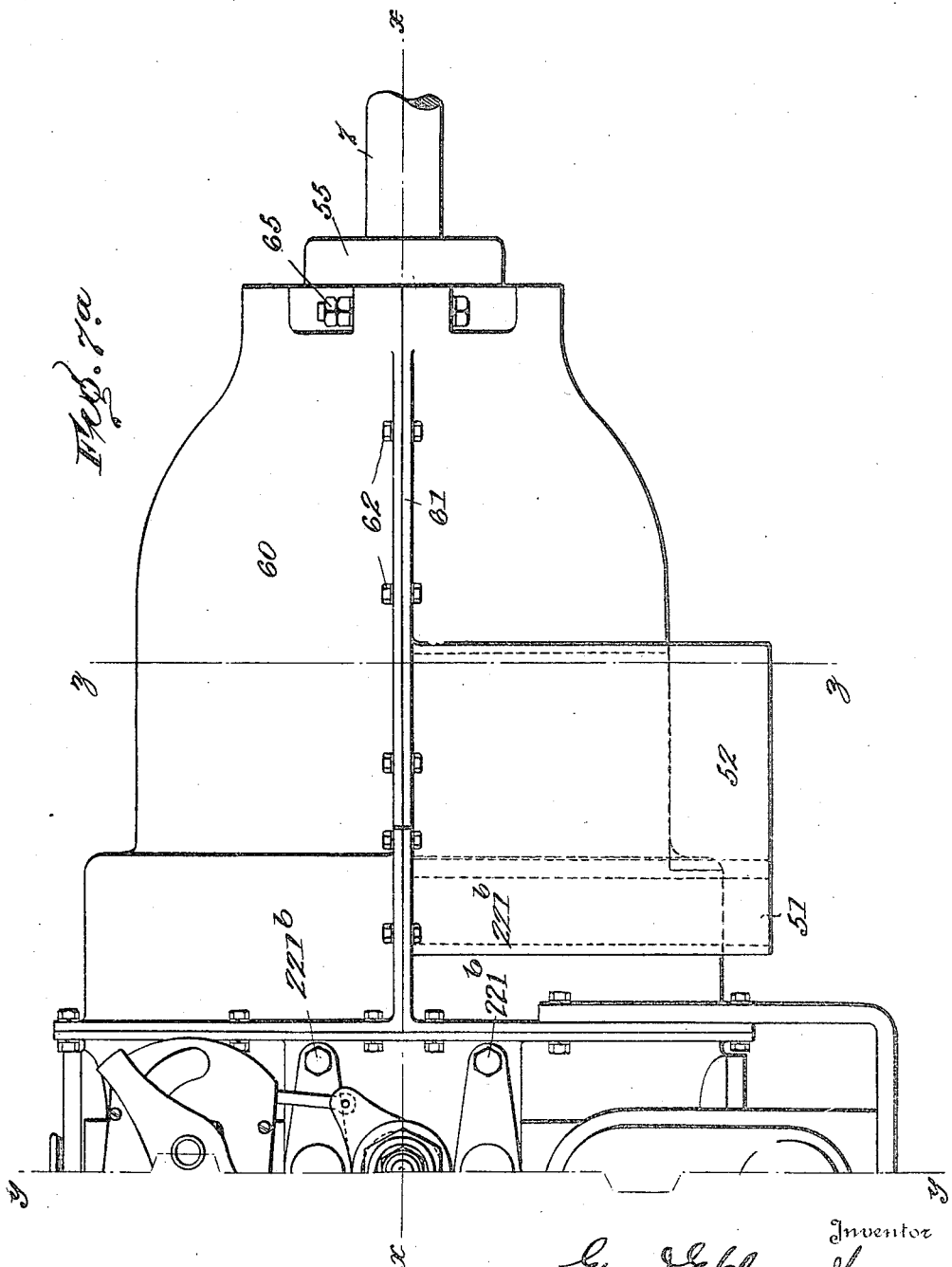

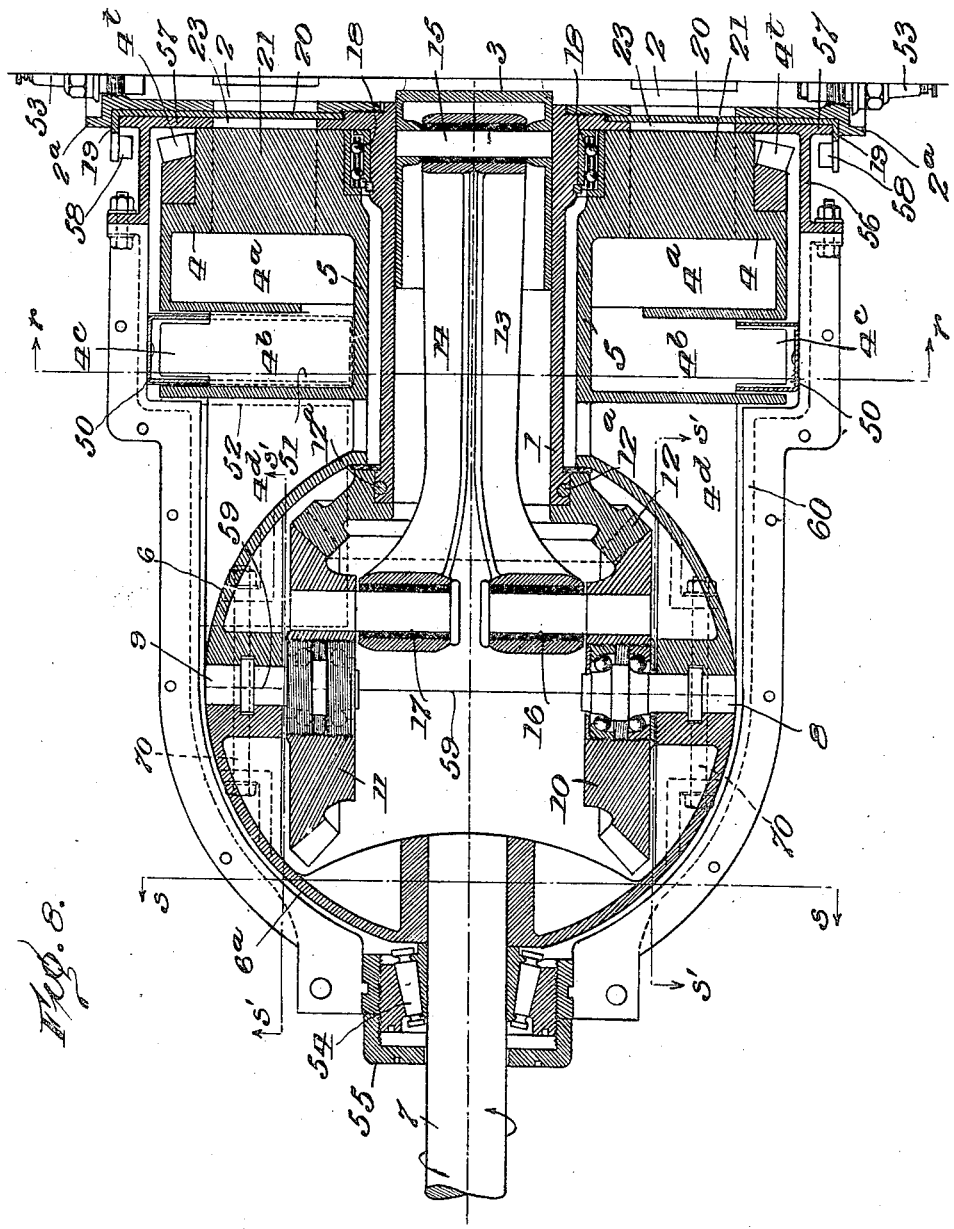

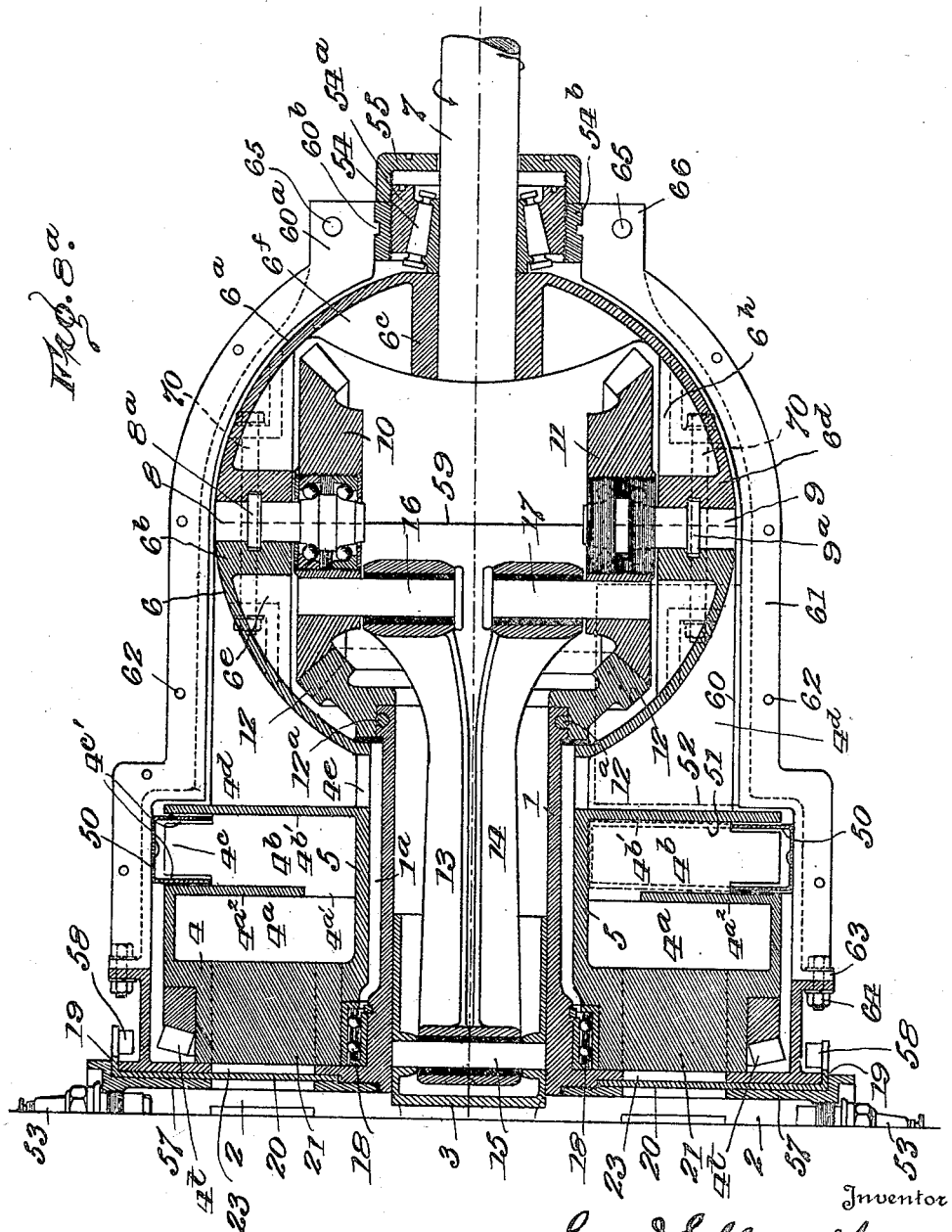

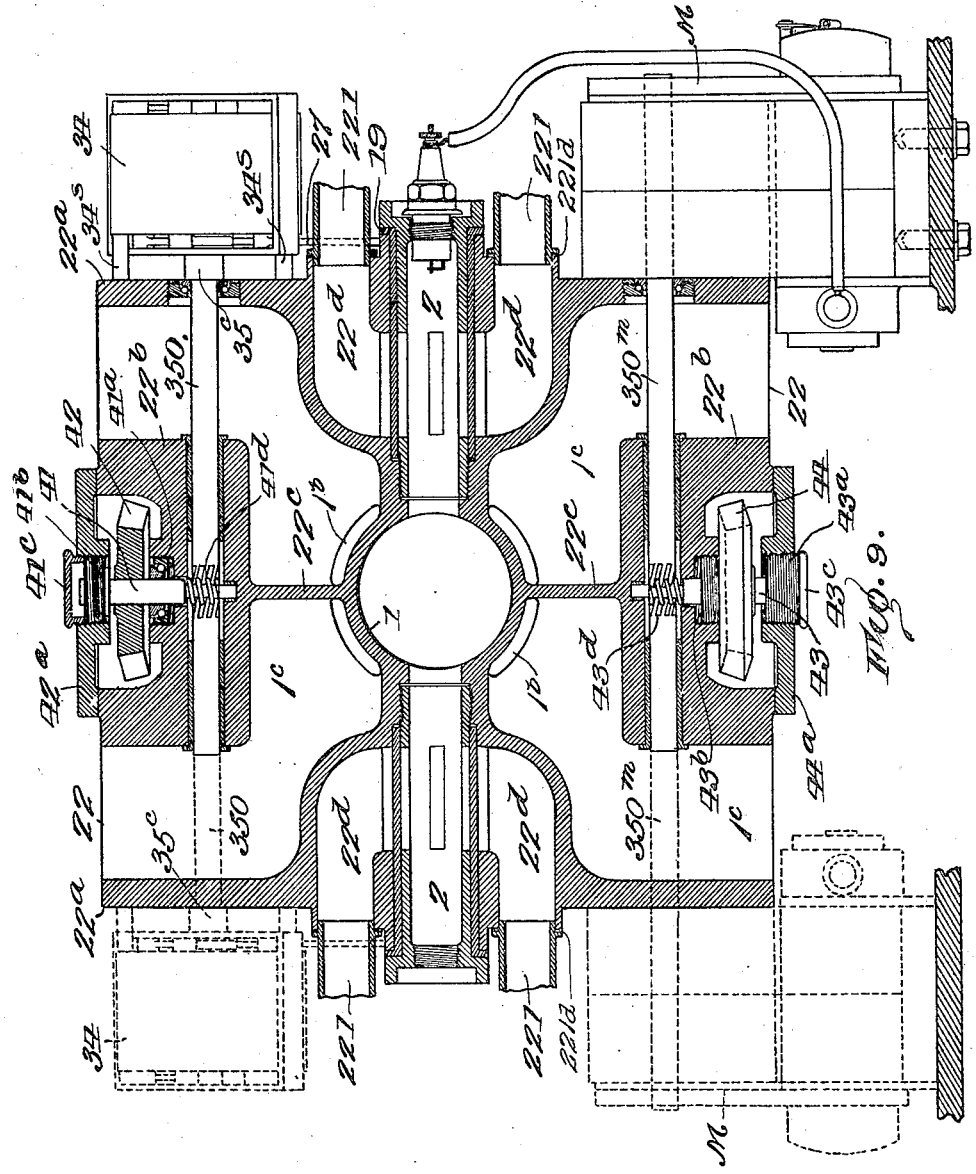

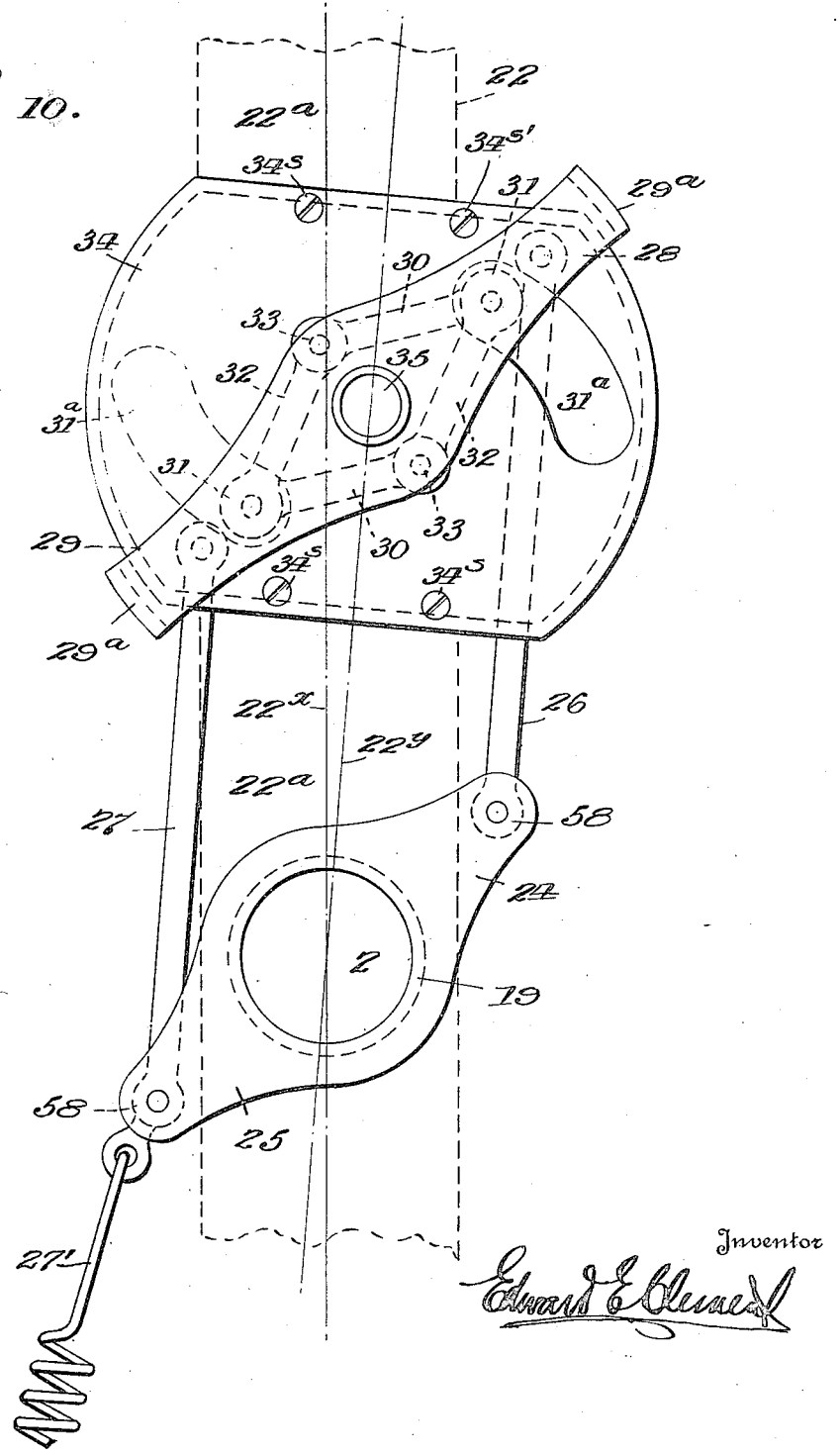

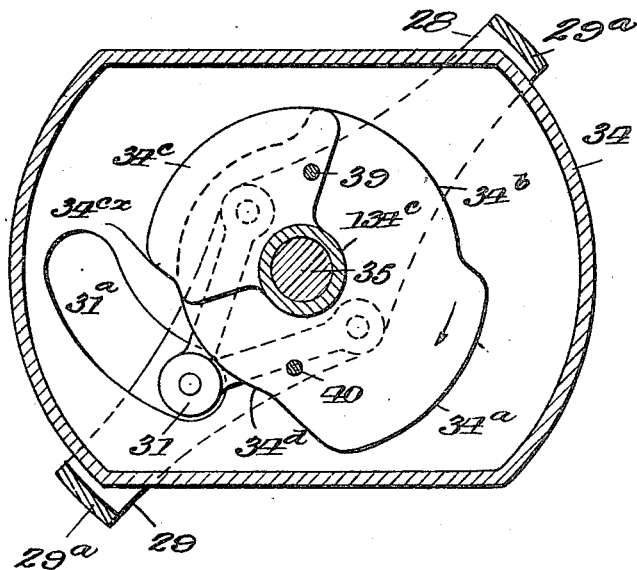
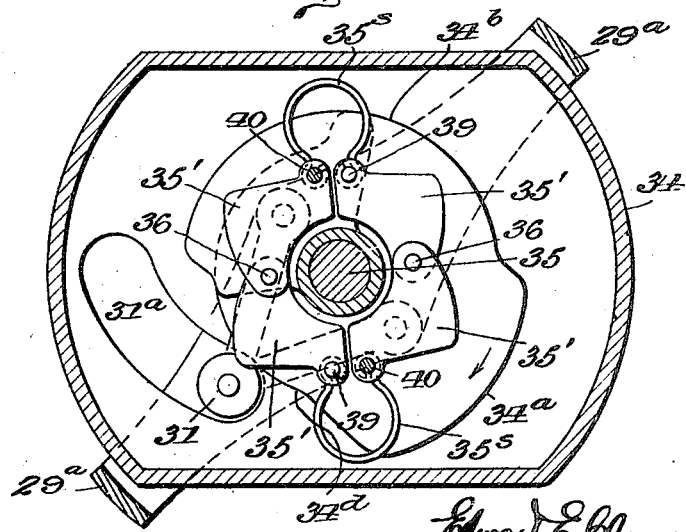

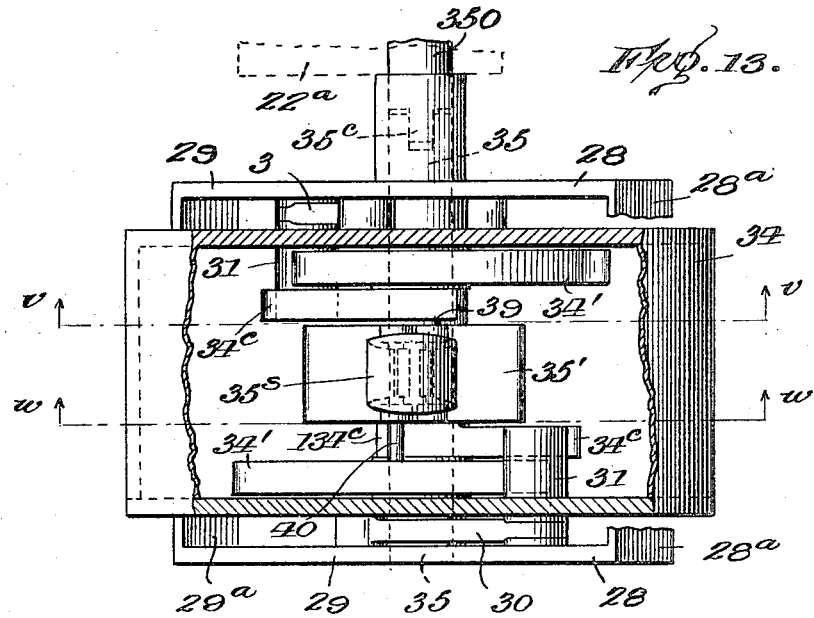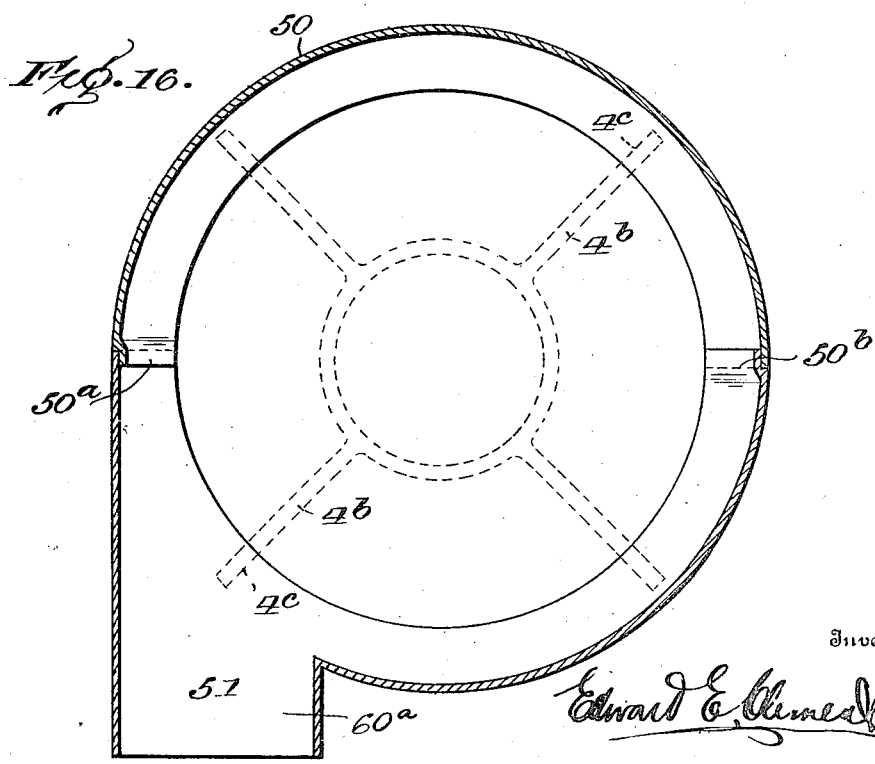

Nov. 27, 1928.
E. E. CLEMENT
1,693,547
INTERNAL COMBUSTION ENGINE
Filed Oct. 7, 1921   14 Sheets-Sheet 13
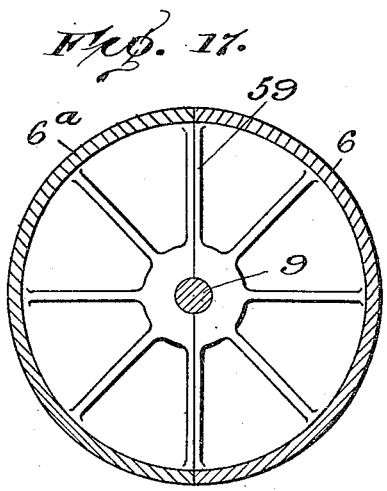
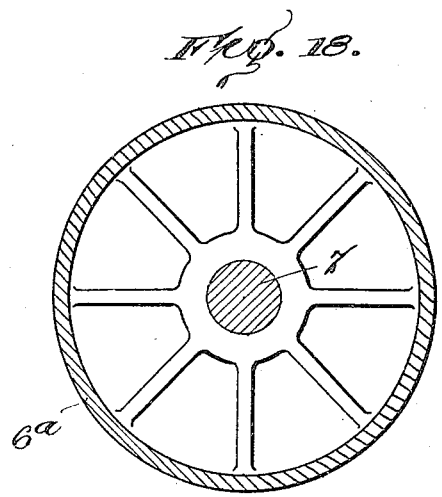
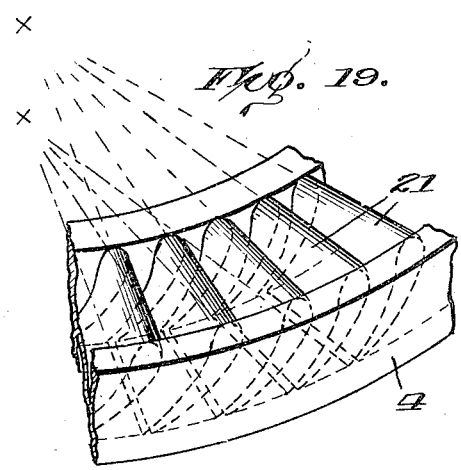
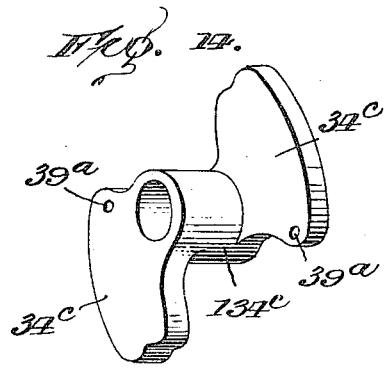
Inventor
Edward E. Clement Nov. 27, 1928.
E. E. CLEMENT
INTERNAL COMBUSTION ENGINE
1,693,547
Filed Oct. 7, 1921    14 Sheets-Sheet 14
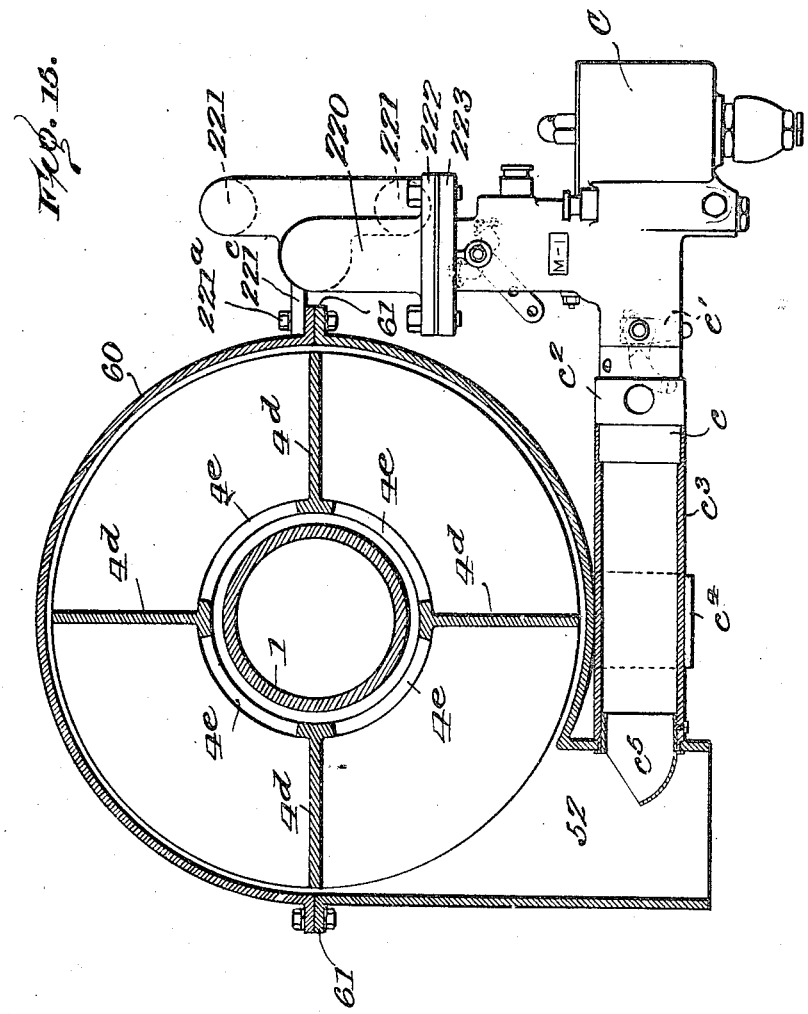

Patented Nov. 27, 1928.

1,693,547

UNITED STATES PATENT OFFICE.

EDWARD E. CLEMENT, OF OCEAN CITY, NEW JERSEY.

INTERNAL-COMBUSTION ENGINE.

Application filed October 7, 1921. Serial No. 506,146

My invention relates to turbine engines, and has for its objects first, to combine high speed and low speed elements in the same engine, so that each will supplement the other, making the machine self starting and giving higher efficiency at all speeds than with either element alone; second, to balance forces against each other so as to avoid all dead impact and use all energy; third, to balance all moving parts against each other so as to avoid unfavorable gyroscopic effects and to obtain balance of the engine as a whole; fourth, to float the high speed elements against the low speed elements of the engine, on the incoming power stream or head, so that at low speeds the low speed elements will carry the load, supplemented by the high speed elements, and vice versa for high speeds, the division of load for all speeds being proportionate to the speed; fifth, to so relate the actuating parts that the floating action and reaction between them under the fourth head, and also their mechanical mass action or momentum will tend mutually to preserve uniformity of motion or constant speed; sixth, to eliminate all dispensable parts, and by giving each part retained all the functions for which its character fits it, to simplify the engine as a whole, beside reducing its bulk and mass; seventh, to modify all reciprocatory motion in the engine by combining it with circular motion, thus producing in effect an all rotary engine while retaining the benefits of reciprocating parts, especially at low speeds; and eighth, to provide for automatic air cooling and for lubrication without extra parts. Ancillary objects and features of improvement will appear from the detailed description hereinafter.

The invention presented herein is in the nature of a complete embodiment of the principles set forth in my prior application filed June 18, 1921, Serial Number 478,681.

Briefly stated, I attain my objects by combining a high speed turbine element with low speed reciprocating elements or their equivalents, and relating the parts through gearing so that their co-action is entirely harmonic throughout. More specifically, in the type selected for illustration and description herein, I employ a pair of co-axial oppositely rotating turbines with a pair of oppositely but synchronously working pistons reciprocating in the common axis of the turbine bodies, and connect the parts with each other and the power transmitting shafts by planetary gearing.

Many detailed features of invention will appear from the description hereinafter and in the appended claims.

My invention is illustrated in the accompanying drawings in which:

Fig. 4 is a diagram illustrating the means for varying the distribution of fluid pressure between the rotary and the reciprocating sides of the system;

Fig. 5 is a diagram illustrating the drive and timing system for valves and ignition;

Figs. 6 and 6ª together form a top plan view of the engine as a whole; Figs. 7 and 7ª together form a side view of the same;

Figs. 8 and 8ª together form a horizontal section of the engine, taken on the line marked 8—8 in Fig. 7;

Fig. 9 is a vertical transverse section taken on the line marked 9—9 in Fig. 7 and looking in the direction of the arrow in that figure; the cutting plane being deflected at the upper and lower timing shafts to show one of each in full lines;

Fig. 10 is a front view of the valve operating cam box;

Fig. 11 is a section on the line 11—11 of Fig. 13;

Fig. 12 is a section on the line 12—12 of Fig. 13;

Fig. 13 is a top view of the cam box with the casing partly broken away;

Fig. 14 is a perspective view of one of the cam members;

Fig. 15 is a section of the air cooling blower on the line 15—15 of Fig. 7 looking in the direction of the arrow, and showing the carburetor and its air supply connection;

Fig. 16 is a section of the exhaust ring taken on the line 16—16 in Fig. 8 looking in the direction of the arrows, and showing the exhaust blower blades in dotted lines;

Fig. 17 is a sectional view on the line 17—17 of Fig. 8.

Fig. 18 is a sectional view on the line 18—18 of Fig. 8.

Fig. 19 is a detail perspective view of part of the turbine rotor body, showing the arrangement and contours of the vanes.

Figure 1:
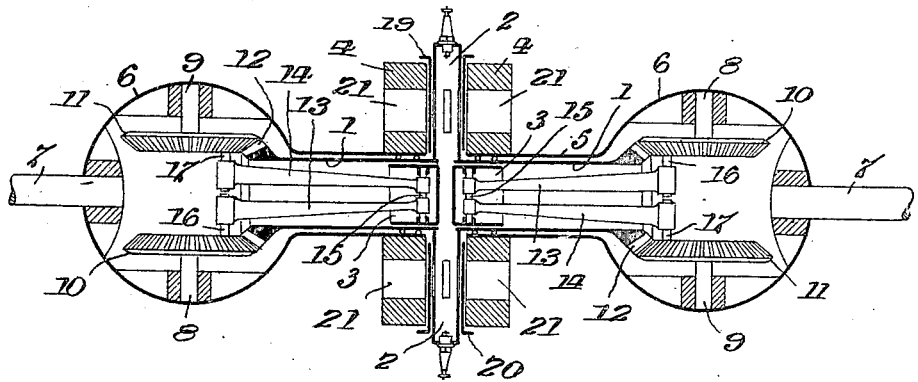
Fig. 1 is a diagram showing without detail the main elements of the engine.

Referring to the drawings, in Fig. 1 I have shown a horizontal section similar to Fig. 8, but in diagrammatic form for simplicity. In this Fig. 1, the casing of the engine and other parts are omitted. 1—1 indicate a pair of cylinders which are in line and connected together end to end so as to constitute in effect one cylinder having at its middle point a pair of transverse pressure or explosion chambers 2 and containing a pair of oppositely reciprocating pistons 3. The chambers 2 are formed in a central casting between cheek plates integral with the cylinders, these cheek plates however not being shown in the diagram. On the outside of each cylinder 1 is a turbine rotor 4 having a cylindrical sleeve hub 5 provided with a hollow spherical end 6 extending beyond the end of the cylinder. Each sphere 6 carries a main shaft end 7, exactly aligned with the axis of the cylinder. The shafts 7 are journalled in fixed bearings, not shown in the diagram. Inside each sphere 6 is a pair of aligned transverse shaft 8—9, carrying bevel gears 10—11, meshing with a fixed bevel gear 12 attached to the end of the cylinder 1. Each piston 3 has a pair of connecting rods 13—14 connected at one end to the piston head by the usual transverse pin 15 and at their other ends to wrist pins 16—17 on the gear wheels 10—11. The rotors 4 are aligned and supported for rotation around the cylinders 1 by ball bearings 18 at the inner ends of their hubs 5 and by the main shafts 7 at their outer ends. The explosion chambers 2 are provided with tubular sleeve valves 19—20 each having one pair of opposite ports and turned by cams not shown in the diagram (see Figs. 9, 10, 10ª and 13, hereinafter more fully described) through 90° of motion in three steps to bring said ports into position for intake, compression-explosion, and exhaust working against a spring return. A convenient form of spring for this purpose is shown in Fig. 7 marked 27′, and serves to normally maintain the parts in the position shown in said figure. The explosion chambers 2 have each four ports 90° apart, two for intake (at right angles to the plane of the drawing) and two for exhaust (opening into the blades or vanes 21 of the turbine rotors 4, through which the gases of combustion always pass, either as exhaust gases from the cylinders 1 at low speeds, or with high impact velocity immediately after or at the explosion at high speeds.) The mechanism for timing the valves so as to open the exhaust ports at different times for different speeds of the engine is shown diagrammatically in Fig. 4 and will be described presently. In the ends of the explosion chambers 2 are fitted spark plugs 22—22, taking their current from magnetos, shown in Fig. 9.

The general operation of the engine can now be understood, as a preliminary to the examination of details. The cylinder structure with the central flat web containing the explosion chambers is fixed. The parts 4—5—6—7 are free to rotate thereon and coaxially therewith. The pistons 3 are free to both reciprocate and to rotate within the cylinders and as they reciprocate they drive the rods 13—13 so as to turn the wheels 10—11 on their shafts 8—9. As these wheels mesh on opposite sides with the fixed gears 12, when turning on their own shafts 8—9 they also turn around the axis of gears 12, (i. e., the axis of the engine as a whole) carrying the parts 7—6—5—4 with them, and also causing rotation of the pistons and connecting rods, so that the reciprocating action of the latter parts is in helical figures. Conversely, if the rotors 4 are rotated by power applied to them, they will turn the parts 5—6—7— and with them the shafts 8—9 so that wheels 10—11 are driven around the axis of gears 12 and thereby forced to turn on their own axes (i. e., on shafts 8—9) to both reciprocate and rotate the pistons and connecting rods. If power be applied to both the rotors and to the pistons simultaneously they will supplement each other, and in any reciprocal variation in the division of the power, the resultant amount of energy delivered to shafts 7 being the sum of the amounts flowing through the two paths, will be a constant as long as the initial energy applied remains constant.

In starting this engine the pistons carry the load, the turbines or rotors 4 doing little work but acting as fly wheels and also to muffle the discharge. The engine may be adjusted to run in this manner as a simple reciprocating engine, with efficient action due to practically the entire engine rotating as a pair of fly wheels.

As the speed increases the load is picked up increasingly by the turbines until their point of greatest efficiency is reached, the pistons then acting as driven pumps to suck in and compress the explosive charges for the turbine rotors. The engine may also be adjusted to normally run thus as a turbine, with all the advantages inherent in turbines and with the great additional advantage of balance and regulation by the piston action.

The two rotors 4—4 on opposite sides of the central web, are geared together across the same by balance pinions rotating on radii 90° displaced from the explosion chambers, and the turbine vanes 21—21 are oppositely set in the two rotors. Thus the two rotors 4 always rotate in opposite directions, neutralizing any untoward gyroscopic effects, and maintaining a perfect balance.

Figure 2:
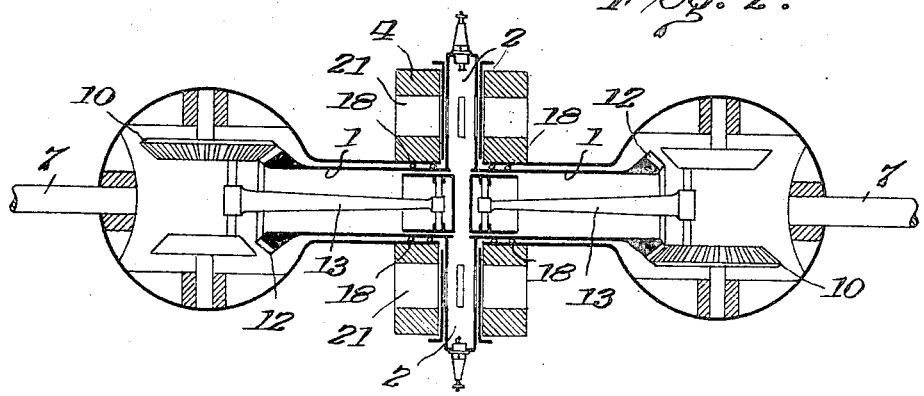
Fig. 2 is a modification.

Fig. 2 shows the same parts in Fig. 1, except that the connecting rods 13 are single and the wheels 10 only have gear teeth. The operation is the same.

Figure 3:
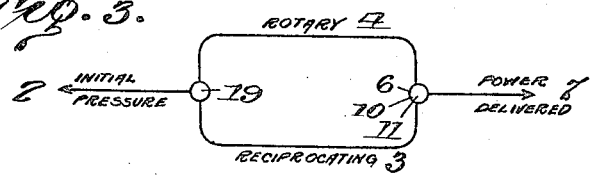
Fig. 3 is a diagram illustrating in abstract form the relation between the rotary and the reciprocating sides of the system in this engine.

Disregarding Fig. 3 for the moment, reference is had to Figs. 4 and 5, for the purpose of briefly explaining the principle on which the timing is based for the distribution of pressure between the rotors 4 and the pistons 3. In Fig. 4 the explosion chamber 2 is shown in section with its four ports, and around it the sleeve valve 19 with its pair of opposite ports in neutral or intermediate position, and the cheek plates heretofore referred to are indicated at 22, in order to show ejection openings or ports 23 which register with the exhaust or turbine ports in the explosion chamber. Connected to the valve tube are arms 24—25, which oscillate with the valve sleeve around the axis of the explosion chamber, in a plane perpendicular thereto. These arms 24—25 are connected by parallel rods 26—27 to a pair of similar arms 28—29 which are oscillated through a link 30 by cam roller 31 carried on one end of an arm 32, the other end of which is pivoted at 33 to a fixed support. (It should be understood that this figure is theoretical only and that the actual mechanical construction will be found in Figs. 10 to 14 inclusive.) The roller 31 rides on the periphery of a rotary cam 34 carried on a central shaft 35 by which it is driven in a clockwise direction. The cam has four divisions, the peripheries of which are arranged in three steps, or at three radial distances from the center. The four divisions are marked $34^a$ (intake), $34^b$ (compression), $34^c$ (explosion), and $34^d$ (exhaust). The segment $34^c$ is made separate from the rest of the cam, and is adjustable upon the shaft 35, always rotating with the main body of the cam but altering its angular relation thereto around the center in proportion to the speed of rotation. This is accomplished by means of a pair of governor weights 35′, pivoted together at 36 and having opposite arms pivoted at 37—38 on pins 39 and 40 secured upon the movable segment $34^c$ and upon the body of the cam 34, respectively. In this diagram Fig. 4, the governor weights 35′ are shown removed to one side, and their pivot points 37 and 38 connected to the pivots 39—40 by dotted lines. In actual construction, the points 37 and 38 are co-incident with the points 39 and 40, and the circular curved inside faces of the weighted arms 35′ surround the central sleeve of the cam segment $34^c$. At low speeds, the arms 35′ are held in toward the center by springs not shown in the diagram, and the cam segment $34^c$ then lies in the position shown in Fig. 4, that is to say forming a full one-quarter extension of the surface $34^b$, thereby giving one-fourth of the full rotation for the explosion or power stroke. At low speeds this is necessary to give the reciprocating pistons their full power, and it is only at or near the end of their stroke, as in ordinary reciprocating engines, that the roller 31 drops from the surface $34^c$ on to the surface $34^d$ and opens the exhaust pipe by turning the sleeve 19 through 45°. As the speed of the engine increases, however, governor weights 35′ move out against the tension of their springs farther and farther from the center under the influence of an increasing centrifugal force. In so doing by pulling on the two points 39 and 40 which are respectively movable and fixed, they turn the segment $34^c$ on the shaft 35 so as to lengthen the time of exhaust by uncovering more and more of the exhaust surface $34^d$, and at the same time to shorten the time of the explosive pressure allotted to the pistons for their so-called "power stroke". In other words, as the speed increases the exhaust is opened earlier and earlier, until, when the critical speed is reached at which the turbine rotors 4 are most efficient, the segment $34^c$ has been moved through approximately 90°, so as to bring the openings of the turbine ports 23 into approximate coincidence with each explosion of the charge. Should the speed of the engine decrease, the centrifugal force exerted upon the weights 35′ will of course become less and counter rotation of the segment $34^c$ is produced by the action of the governor springs referred to.

There is a particular purpose achieved by mounting the cam roller 31 on the pivot arm 32, whose pivot 33 is carried on a fixed part. Not only is the drag of the roller taken up and its motion made to follow an arc around the center 33, rather than a straight line radial to the cam, (which has many well known disadvantages), but also, as the cam rotates in a clockwise direction or away from the pivot point 33, there is a direct kicking action of the cam faces, tending to lift the roller 31 directly on a line tangent to its own arc at the point of impact. In further describing the mechanics of the cam box and connections shown in Figs. 10 to 14, it will appear that the motion of all of these parts is circular and there is no pure reciprocating motion employed. It should also be observed that the movable cam segment $34^c$ trails, so that while it is moved back and forth with respect to the main cam under the surface friction of the roller, its shoulder $34^{cx}$ never has to lift the roller, hence the very trifling friction of the running over the edge of the cam is all that has to be overcome by the weights 35′ and their springs in adjusting the movable segment $34^c$.

It will be observed further, in applying the principle of using only modified reciprocating motion, that the rods 26 and 27 which take the place of the usual tappet rods in reciprocating the engines, constitute elements of a parallel motion, and as the arms 24—25 and 28—29 are of the same length, the rods 26—27 always swing through arcs having the radius of the said arms, said parallel motion being operated by the cams in one direction and the usual retractile spring in the other.

Fig. 5 is a diagram following in general the transverse central section of the engine shown in Fig. 9, but diagrammatic in its nature, and produced for the sole purpose of explaining the manner in which the cams 34 and incidentally the magnetos M are driven. The cams 34 are enclosed in boxes 34 mounted on the two sides of the engine, those on one side being the duplicates of those on the other as will hereinafter appear. A pair of worm shafts 350 are journalled in the central portion of the frame of the engine, parallel to and vertically above the explosion chambers, while a similar pair of shafts 350$^m$ are journalled in precisely the same manner parallel to and below the explosion chambers. The shafts 350 do not coincide as to their axes, but lie parallel and with their inner ends engaging opposite sides of a worm shaft 41 driven by the balance pinion 42. Similarly, the shafts 350$^m$ lie parallel to each other and their inner ends engage opposite sides of the worm shaft 43 driven by balance pinion 44. These balance pinions as heretofore stated are driven by the rotors 4 and for this purpose each rotor is provided around its periphery with teeth 4$^t$, which will be fully described hereinafter.

It will now be understood that when the engine is started, the pistons carry the load and turn the turbine elements or rotors 4 which in turn through the balance pinions 42 and 44 impart motion to the shafts 350 and 350$^m$, which in turn drive the cam mechanisms 34 and the magnetos M, respectively. As there are two explosion chambers 2 and two spark plugs, and two sleeve valves 19—20, so there are provided two magnetos and two cam boxes 34 containing two complete sets of cams, each driven by its own shaft 350. There are no "rights and lefts" in this engine, but all parts are in duplicate, so that every part being symmetrically opposite its mate, always finds a balance, as well as a duplicate part to carry the load and do the work in case of trouble. This duplicate construction is not indispensable, since of course both valve sleeves could be controlled from the same cam box 34 by suitable link connections within the knowledge of every skilled mechanic, and one magneto could furnish the sparks for both spark plugs, both of which spark at the same time, and therefore require no distribution. The duplicate construction is preferred however, and secures great advantages of symmetry as well as certainty in operation of the engine throughout.

As the engine starts, if under any load, the shafts 7 derive power almost entirely from the pistons. Therefore a full length power stroke is insured by the initial position of the cam segment 34$^c$ as shown in Fig. 4. As the speed increases however, the said cam segment becomes automatically adjusted, and more power will flow to the turbines, by reason of the gradual lengthening of the exhaust period. Finally, when the segment 34$^c$ is back to the limit, and the ports 23 to the turbines are opened, at or immediately after each explosion, the full power of the explosion goes to the turbines, and almost nothing to the pistons, which are then at the top of their stroke, as shown in Fig. 1. In this position they always get the kick of the turbines, which so long as the movable cam segment is back, are really floated on the power stream against the pistons. It may be stated here that by properly adjusting the turbine vanes to absorb the power of impact from the explosions, the engine can be made to operate at low speeds as well as high speeds practically without any valve division of the explosive force between the turbines and the pistons. In other words, at everything above the initial speed, (when the whole power stroke is preserved for the pistons, and the exhaust is only opened after the first explosive pressure has been exhausted) from that point to the limit of coincidence of exhaust and explosion the pistons and turbines are floated or "kick" against each other on each explosion.

Fig. 3 will now be understood. It illustrates diagrammatically the division of the initial fluid pressure in the explosion chambers between the rotary elements 4 and the reciprocating elements 3 of the engine, and the recombination of the power transmitted through both sides at the shaft ends 7. At the points marked 19 the valves at low speeds actually distribute the initial pressure between the rotary and reciprocating elements 4 and 3, but at high speed the valves are opened to both elements from and after the instant of explosion, so that then they are truly floated against each other on the initial pressure stream 2.

Figs. 1 to 5 inclusive are diagrammatic and are not to scale. Figs. 6 to 15 inclusive are reduced copies of working drawings, and are therefore to scale, which may be determined from the rotor body 4, the outside diameter of which (without gear teeth) is twelve inches. The design shown in these scaled figures follows standard practice for engines using gasolene or "motor fuel". The reciprocating part of the engine has 3" bore by 3" stroke on each side, or a 6" total compression stroke. The connection through gears 10—11—12 is for equal rotation, i. e., the rotors 4 make one complete rotation for each double stroke of the pistons, hence, as there is one explosion for two double strokes of the pistons (4 part cycle operation), the turbine vanes receive one power impact through the exhaust ports for every two rotations. In slow running these ports are open for only one-fourth of a complete cycle or one-half a rotation of the rotors 4, but as the engine speeds up and the cam segment 34$^c$ is gradually moved to advance and lengthen the exhaust period, the vanes 21 are exposed to higher and higher pressure and for a longer and longer time. The pistons however, by reaction of the gas pressure against them will always take enough power to overcome their inertia and keep them moving in synchronism with the rotors during the power generating part of the cycle. On their return stroke they are driven by the rotating parts and assist in scavenging, which is completed toward the end of the stroke by outward suction of the turbine vanes 21.

Referring to Fig. 8, which through necessary requirements of the Patent Office drawing sheets is made in two halves, the casing of the engine is shown, with the top half removed, at 60, the thickness of the body being indicated by dotted lines and the flange 61 with openings 62 for securing bolts in full lines. The same parts are shown in Figs. 6—6a in plan. The bearings for the end shafts 7 are carried on this casing 60. Each bearing is designed to receive thrust from the center of the engine as well as to furnish a radial frictionless bearing for the shaft 7. The coned rollers 54 have their axes in the sides of a cone the large end of which is toward the center of the engine, so that any thrust from the turbines outward toward the main bearing is taken up by pressure of these rollers against their compression ring 54a which by means of a spanner is adjusted in the ring 54b which in turn is locked in the bearing block against longitudinal movement 60a by means of an annular feather 60b. The upper and lower halves of the bearing block are locked together around the ring 54b by means of bolts 65. The end of the bearing is enclosed, and at the same time the ring 54a is locked in its adjusted position by means of a locking ring covering cap 55, also set up by means of a spanner.

The gear wheels 10 and 11 in each of the spherical shells 6 are carried on ball bearings on the stub shafts 8 and 9. Each of the spherical shells 6 is divided at 59, the end portion 6a being removable by taking off the top of the casing, and removing parts of the end bearing. When the parts are all assembled the two halves of the shell are locked together by through bolts 70 (see also Fig. 6 wherein the upper part of the shell is partly broken away to show the top of the sphere in full lines). These spheres, it will be remembered as described in connection with Fig. 1 are parts of the rotor, and are integral with the turbine body and hub 4—5. When the two halves of the shell are put together on the line 59, the shafts 8 and 9 are locked in position by means of annular feathers 8a and 9a fitting in grooves in the two halves of the shell. The wheels 10—11 are journalled on ball bearings which are so designed as to take up double thrust, inward as well as outward, the ball bearings being provided with combined dust caps and locking rings as clearly shown in Figs. 8—8a. The wrist pins 16 and 17 are set solidly in the wheels 10 and 11, constituting cranks for the connecting rods 13—14 connected to the pistons 3. Each connecting rod is provided at its end bearings with the usual liners, and the wrist pins 16 and 17 preferably have bearing flanges at their inner ends adjacent to each other, so as to keep the connecting rods in line.

The rotors or turbine bodies 4, with exhaust chambers 4a, exhaust blower blades 4b, air cooling blades 4d, and the semi-spherical shells 6, are all one casting so as to be integral. The semi-spherical shells 6a are separate castings matching shells 6 as shown. When assembled, the parts 4 to 6a are rigidly united into one body journalled at one end on ball bearings 18 and rigidly connected at the other end to the main shaft 7 which is accurately centered and journalled in the end bearing already described. The spherical shell, regarded as a whole is the crank casing of the reciprocating engine and carries the lubricating oil therefor which is distributed in a well understood manner by splash action, is provided with inwardly projecting solid collars 6b, 6c and 6d, from each of which radiate cast flanges or webs 6e, 6f and 6h, the inner edges of which, toward the center of the sphere, are so proportioned as to leave just enough clearance for the gears 10—11—12 and for the movement of the wrist pins 16—17. When the shell is separated on the line 59 by removing the bolts 70, the stub-shafts 8—9, wheels 10—11, connecting rods 13—14, and piston 3 can all be removed without otherwise taking down the engine.

Between the hub 5 of each rotor and the cylinder 1 is an air space 1a. As the section shown in Figs. 8—8a is taken on a plane passing through the explosion chambers, the air chambers 1a are not shown opening into the center of the engine, being obstructed in this plane by the walls of the explosion chamber. By reference to Fig. 9 however, it will be noted that the air chamber communicates through four segmental openings 1b with air intake chambers 1c in the central casting. These chambers open top and bottom of the engine, so that air is drawn in constantly for cooling purposes, through the central fixed parts, then passes around each cylinder through the space 1a and is thrown out by the blower blades 4d through a discharge nozzle 52 formed in the casing (see Fig. 15). The operation of this cooling air discharge will be referred to again in describing the carburetor connections.

The actuating and exhaust actions of the turbine depend on the one hand upon the exhaust from the explosion chambers, and on the other upon the centrifugal blower action of blades 4b—4c, shown in transverse section in dotted lines in Fig. 16. The turbine body 4 is in effect a solid casting with the vanes 21 and also the walls of the chambers 4ª, etc., and the ribs 4ᵇ and 4ᵃ, cast in it or on it by means of suitable cores. The shape of the blades or vanes of the turbine is difficult to show in one figure and in a plane surface view, such as a plan or section. The inner and outer cylindrical limits of the vanes are indicated by straight dotted lines extending from right to left through the body of each turbine rotor 4, but the contours and angles of these vanes are such, as in all turbines, that only a small portion of each of several vanes would appear in any diametrical plane section of the rotor. Hence I have chosen to indicate these separately in Fig. 19, which will be referred to later on. For present purposes it is to be understood that the exhaust gases, under greater or less pressure according to the speed and automatic timing device shown in Fig. 4, will pass through the vanes at 21 when the exhaust port is opened by the valve 20, into the chamber 4ª, and thence will be drawn by suction through the central annular opening 4ª′ into the chambers between blades 4ᵇ and thence will be driven out by the centrifugal blades 4ᶜ through a copper exhaust ring 50, shown in section in Fig. 16. It should be observed, that during low speed operation of the engine when the gases which thus emerge through the rotor have already imparted most of their pressure to the piston due to the late opening of the exhaust at 20, said gases are baffled by the vanes 21, which thus absorb any energy remaining, and by the circular flange 4ª² constituting one wall of the chamber 4ª, so that a separate muffler, even at low speeds, is unnecessary. Furthermore, the action of the blades 4ᶜ even when the exhaust valve is closed at 20 is to create a partial vacuum in the chamber 4ª which not only assists in scavenging but also acts to further silence the exhaust. At the last end of each exhaust stroke of the piston 3, scavenging is further aided by the action of the turbine vanes themselves, which being carried around by the energy stored in the rotating parts, tend to draw out by suction any gas remaining in the explosion chambers. The combined action of the vanes and the blower blades 4ᵇ—4ᶜ is therefore to create a partial vacuum in the explosion chambers themselves just before the exhaust port closes and the intake ports open. As each explosion chamber has two opposite exhaust ports opening into the vanes 21 of the two opposite and oppositely rotating turbine rotors 4, and as both explosion chambers communicate through the center of the cylinder between the piston heads, the actions of both impact and exhaust thus described are balanced, synchronous and cumulative in their effects. In other words, all action on the turbine blades, all reaction against the pistons by pressure against the turbine blades, and all suction effects through the turbine blades, are equal and opposite at all times.

The four longitudinal cast webs 4ᵈ—4ᵇ extend from the spherical shell 6 to the annular flange or diaphragm 4ª², and are cross connected by the annular flange or diaphragm 4ᵇ′, which extends from the hub 5 outwardly to the full diameter of the rotor body 4. The blades 4ᵇ—4ᶜ are those portions of the longitudinal webs which lie between walls 4ª² and 4ᵇ′, and they are given a greater diameter than the air blower blades 4ᵈ in order to prevent leakage of the exhaust gases into the air blower side of wall 4ᵇ′. The direction of these gases into their proper discharge channel 50—51 (see Fig. 16), is ensured by slotting the blades 4ᶜ radially at 4ᶜ′ and making the exhaust channel in the shape of a ring 50, preferably of copper, U-shaped in cross section, with its channeled body receiving the ends of the blades 4ᶜ and its edges lying in the slots 4ᶜ′. As in standard blower practice, the discharge from this ring 50 is through a tangential nozzle 51 which may be connected to an exhaust pipe as usual. Any tendency toward leakage as between the exhaust gas and air blowers is from the air into the gas, owing to the greter velocity and pressure at the outer edges of blades 4ᶜ.

The rotor bodies 4, as they rotate around the axis of the cylinder 1, have their planes of rotation parallel to each other. Advantage is taken of this to couple them together by means of what I call balance pinions 42 and 44 (see Figs. 5 and 9, which show the pinions in side view and in section, and Figs. 6–6ª which show the casing of pinion 42 in plan, and Figs. 7–7ª which show both casings in side elevation, top and bottom). These pinions are fixed on vertical stub shafts 41 and 43, respectively, which turn in ball bearings 41ª and 41ᵇ for the shaft 41, and 43ª and 43ᵇ for the shaft 43. The pinion 42 is covered by a cap 42ª bolted to the frame at the top of the engine. This cap carries the upper ball bearing 41ᵇ, over which is screwed a combined dust cap and locking ring 41ᶜ. The lower pinion has a similar cap 44ª and its lower or outer ball bearing has a dust cap locking ring 43ᶜ.

The pinions 42 and 44 balance the two rotors 4 against each other, as the latter rotate in opposite directions and at the same speed. This balance is important in the 4-part cycle design of this engine, because the two pistons 3 work in synchronism with their respective rotors 4, and must therefore work synchronously with each other. Moreover, the timing of the engine is necessarily synchronous for both pistons and both rotors, and as the pinions 42 and 44 are jointly driven by the two rotors, they are selected to control the timing shafts 350 and 350ᵐ. The two pinions mesh with toothed rings 4ᵗ on the respective rotor bodies, to which the rings are keyed so that they cannot slip or turn thereon, (see section, Fig. 8—8ª). The reasons for making these toothed rings separate from the rotor bodies, in which the teeth 4ᵗ might otherwise be cut, are, first the difficulty of cutting teeth in a rabbet, and second because the bodies of the rotors are of cast iron or cast steel, and the teeth require to be hardened.

The rotors make one complete revolution each for each complete (2 part) stroke of the pistons. The pinions make four revolutions to one of the rotors. The worm gears $41^d$ and $43^d$ are one to eight, i. e., there are eight teeth on each shaft 350 or $350^m$, and the worm is single. Thus the shafts 350 and $350^m$ each make one complete revolution to each two revolutions of the rotors, or to each complete cycle of the reciprocating side of the engine. The magnetos shown are standard Bosch DU1 with either one or two spark terminals, and driven by front gears to avoid couplings inside the engine cheeks 22.

The actual mechanical construction of the cam boxes is shown in Figs. 10 to 14 inclusive. Each cam box comprises a casing 34 in which the cams are assembled as a unit, on a short shaft 35 which when the box is placed in position on the front $22^a$ of the engine (to which it is secured by screws $34^s$) engages the shaft 350 through a coupling $35^c$ (see Fig. 13). In this position the parts are all in the position shown in Figs. 9, 10, 11, 12. It should be noted that the boxes are not vertically above the explosion chambers 2, because of the lateral displacement of shafts 350, which have to pass on opposite sides of their central driving shaft 41 (see Figs. 9 and 6–6ª. In the latter figure the shaft ends and driving worms are shown in dotted lines). The same is true of the magnetos, whose driving shafts $350^m$ are laterally displaced for the same reason. One screw $34^{s\prime}$, due to this displacement, is brought outside the vertical line of the cheek plate 22 (see Fig. 10) and to take this screw a lateral boss is cast on the cheek plate. The line $22^x$ in Fig. 10 is the true vertical line through the center of the explosion chamber 2 and valve cylinder 19, while the line $22^y$ is the line through this center and the axis of shafts 350 and $350^m$. On this latter line therefore the parts are related. Around the box, and free to turn on the shaft 35 through an angle of 90° is a yoke composed of flat arms 28—29 extending across front and back of the box, and integral connecting members $28^a$, $29^a$ which swing around the cylindrically curved sides of the box. The upper ends of the valve rods 26 and 27 (see also Fig. 4) are pivoted to the ends of the arms 28 and 29 at the rear of the box, and extend thence downwardly to pivot pins 58 on the ends of arms 24 and 25 on the valve tube 19. When arms 28—29 swing around their shaft 35, the arms 24—25 swing in parallel motion thereto, turning the valve tube 19. In Figs. 10, 11, 12, the parts are shown in the extreme position for exhaust, that is to say with the ports 20—23 open from the explosion chamber 2 to the turbine vanes 21. It should be noted that in the diagram Fig. 4 the cam roller is above the cams and the motion is therefore reversed, but the principle is the same. The highest cam surface is for intake, the lowest for exhaust (or turbine action) and the intermediate for compression and explosion, the last named being shortened as the exhaust is lengthened by speeding up.

The cams in the box 34 are in pairs. This can be best seen in Fig. 13, where cams $34'$ are located at the front and at the back of the inside of the box, both rigidly attached to the shaft 35. The cams $34^c$ are mounted on a sleeve $134^c$ (see Figs. 13 and 14) which surrounds the shaft 35 and is free to turn on it between the cams 34. Around the sleeve $134^c$ lie the governor weights $35'$, (see Figs. 12, 13) in two opposite pairs, each pair pivoted together at 36, and having their other extremities journalled on pins 39 and 40 set respectively in one of the adjustable cams $34^c$ and in one of the main cam bodies $34'$. These pins extend in opposite directions, as shown in Fig. 13, where it will be observed the pin 40 from the left hand weight $35'$ comes forward toward the front of the box, and the pin 39 of the adjacent weight on the right goes back to cam $34^c$ on the rear side of the box. The length of the sleeve $134^c$ and therefore the width between the adjustable cams, is made enough to allow for wide governor weights, since their radial dimensions are limited by the necessity of "throw", and mass is necessary.

The weights $35'$ are normally at low speeds held together nested around shaft 35 by means of springs $35^s$, which are substantially circular in curvature when closed but flatten as they open—another requirement for clearance in the "throw" of expansion. It is understood of course that these weights and springs rotate with the cams and cam shafts 35, and must clear the walls of the box at highest speed when the weights are fully expanded. The inner ends of the springs are snapped over the pins 39—40 of opposite pairs, through slots cut in the weights where they take over these pins (see dotted lines, Fig. 13), and are held in place by their own resilience. In holding the weights $35'$ together, the springs also hold the cams $34^c$ in low speed position, since each spring couples a fixed pin 40 (on cam body 34) with a movable pin 39 (on adjustable cam $34^c$).

As the cams are double, so are the rollers 31, connected by links to work oppositely on the yoke or frame 28—29, always supplementing each other symmetrically. Fig. 11 is a section through the cam box on the line $v$—$v$ of Fig. 13, and Fig. 12 is a section on line $w$—$w$ of Fig. 13. Both these Figures 11 and 12 therefore show only the rear slot 31ª in the box, with the rear roller 31 working therein. Figs. 10 and 13, however, show both rollers and both slots. The link connections 30—32 between the rollers and the yoke 28—29 lie outside the box, and the rollers come into the box through slots 31ª in front and back thereof. As shown the upper roller and its links are on the front of the box and cooperate with the front set of cams, while the lower roller and its links are at the back of the box and cooperate with the rear set of cams (see Figs. 10 and 13). Of the two links, in each case 32 is pivoted at 33 to the fixed wall of the box, and 30 is pivoted on a pivot (directly in line with 33 in Fig. 10) attached to yoke 29. The link 30 in each case is therefore the pulling link, and the link 32 forces the roller to rotate around the fixed center 33. Hence the roller describes a short arc intercepting the arcs of the cam surfaces, and gets a positive "kick" when raised against the tension of the retractile spring 27', as before set forth. As the rollers are symmetrically opposite, top and bottom, the cams, while duplicates, are 180° apart front and back of the box.

Referring now to Figs. 7-7ª, 8-8ª, 9 and 15, the system of carburation and supply will be described. The intake passages 22$^d$ (see Fig. 9) are cast in double pairs between the cheek plates 22 in the central fixed part of the engine, each pair opening at their outer ends above and below the corresponding explosion chamber 2. The intake manifold 220 on each side of the engine has branches 221 leading to the upper and lower openings 22$^d$ in which they are held against interposed gaskets 221$^d$ by means of bolts 221$^a$ and 221$^b$ (see Figs. 7-7ª). The bolts 221$^a$ are secured through the flange 61 of the engine casing, so that the weight of the carburetor C is hung from said flange through lug 221$^c$ on the manifold pipe 220. The carburetor C is a Stromberg M—1, with 1⅛ inch opening. It is connected to the intake by bolted flanges 222—223 with the usual interposed gasket. The air intake $c$ of the carburetor carries a choking valve $c'$ and an adjustable ring $c^2$ to regulate the admission of cold air. A hot air pipe $c^3$ secured to casing 60 by hanger $c^4$, connects the end of intake $c$ to the interior of the discharge pipe 52 for cooling air from the engine, which as heretofore described is drawn from around the cylinder 1 through openings 4$^e$ and thrown out through pipe 52 by the rotating blades 4$^d$ on the turbine. (See Figs. 7-7ª, 8-8ª and 15.) It should be noted that the gas exhaust 51 and the cooling air exhaust 52 lie side by side and are both enclosed in tangential tubular extensions from the casing 60, the gas exhaust however having the copper lining ring 50 with tangential tubular extension shown in Fig. 16, to keep the exhaust gases from entering the air passages, and to protect the casing and other parts from carbon deposits and erosion.

At the end of pipe $c^3$ a curved lip $c^5$ projects into the passage 52 to direct heated air under pressure into the carburetor.

With this system of carburation, by suitably adjusting the mixture and the air intake ports, so-called "motor fuel" and kerosene can be used. By substituting a suitable mixer heated on the same principle, heavier oil can be employed to advantage, as the wide and numerous exhaust ports in the explosion chambers are specially adapted to complete scavenging; while, as heretofore described, the partial vacuum on the outer or blower side of turbine vanes 21 assists in getting rid of free carbon in the products of combustion.

What I claim is:

1. An engine comprising in combination a turbo-rotor and a co-axial piston, with means for variably utilizing a given amount of fluid under pressure in its entirety on said rotor and said piston respectively, in proportion to the speed, in common, planetary gearing interconnecting said rotor and said piston and causing the same to act upon and in coordination with each other and a cylinder surrounding the piston and serving as a bearing for the rotor.

2. In an engine the combination of a rotor element and a reciprocating element co-axial therewith, means for imparting power to both elements, a transverse shaft journalled on said rotor, means connecting said reciprocating element with said transverse shaft to turn the same, a bevel gear in fixed connection with said reciprocating element, gearing meshing with said bevel and driven by said shaft against the same whereby said rotor may drive the reciprocating element or the reciprocating element may drive the rotor, and means for taking power from both in reciprocally varying proportions.

3. An engine of the fluid pressure type comprising a cylinder, a piston fitted to reciprocate within said cylinder, a turbo-rotor journalled around and coaxially with the cylinder and piston, a combustion chamber adapted to variably and differentially supply fluid under pressure to said piston and said rotor respectively according to the speed, and a driving connection between said rotor and said piston whereby the piston and the rotor may act simultaneously and in coordination to produce maximum power at all speeds.

4. An engine comprising two complete units of the type described in claim 3, related in a straight line on the same main axis of rotation, the said means connecting the two units comprising planetary gearing between the said cylinder and the said rotary element.

5. An engine as described in claim 3, in which the reciprocating and the turbo-rotor units are related in a straight line on the same main axis of rotation and are geared to rotate oppositely on said common axis, whereby all parts of each move simultaneously in opposite directions.

6. An engine of the type described in claim 3, in which the turbo-rotor surrounds and encloses the cylinder, with a radial combustion chamber common to both.

7. A high speed fluid pressure engine comprising two turbo-rotors oppositely positioned in parallel planes spaced apart on a common axis of rotation, a combustion chamber interposed between said turbo-rotors for generating fluid pressure and supplying the same simultaneously and oppositely thereto, and geared connections between them for power delivery, said rotors being constructed and arranged to rotate in opposite directions.

8. An engine of the fluid pressure type comprising a rotor element and a piston element coaxial with the rotor element with means to supply fluid pressure variably and differentially to each, according to the speed, said piston being housed and reciprocating within said rotor, said rotor and piston elements being driven independently by said pressure means but being interconnected and operating in coordination with each other.

9. An engine of the type described in claim 8, having a common pressure chamber and a common control valve associated with and mechanically regulated by both moving elements according to the speed of said elements.

10. A power translating system of machine elements comprising a fixed cylinder, a rotary element rotatably mounted in its entirety on said cylinder, a reciprocating element within said cylinder, a gear wheel fixed on said cylinder, and planetary gearing interconnecting the rotary and reciprocating elements and intermeshing with said fixed gear wheel so as to rotate the system of elements as a whole around the axis of the cylinder when power is applied to any part of the system, with means to apply power simultaneously to said rotary element and said reciprocating element, varying the same reciprocally according to the speed.

11. In an engine, a turbine rotor, with means to supply thereto fluid under pressure, an enclosed annular exhaust chamber for said rotor, a separate annular chamber communicating with said exhaust chamber, and provided with an exhaust opening, centrifugal suction blades in said second chamber carried on the rotor and rotating therewith, said blades being so arranged as to tend to produce a partial vacuum in the first chamber when the rotor is in operation.

12. In an engine, a cylinder, a piston within the cylinder, a turbine rotor having its body surrounding said cylinder but separated therefrom to leave an air space, said body having openings communicating with said air space and radial blades so related to said openings as to produce constant circulation of air therethrough while the engine is in operation.

13. In an engine a pressure chamber, a rotor, rotor vanes and means separate from the rotor vanes carried upon and forming part of said rotor to produce a suction of air across surfaces of the pressure chamber and the rotor during operation.

14. In an engine, a cylinder, a piston, a combustion chamber for said piston, a power shaft coaxial with the piston, a fly wheel, means connecting the piston with the fly wheel and the power shaft, and means for driving the fly wheel directly as a turbine from the same combustion chamber as that of said piston, and utilizing all the products of combustion therefrom.

15. In an engine, primary driving parts comprising a reciprocating piston element together with a combined fly wheel and turbine in one element and means utilized in its entirety for driving both elements, said flywheel and said primary driving parts being variably interconnected both as to the means for driving the same and as to the power delivered to the element driven thereby.

16. In an engine, primary driving parts comprising a reciprocating piston element, intake and exhaust passages therefor, and a combined turbine and muffler in one element having rotor vanes interposed in the exhaust path, and suction vanes arranged on said rotor outside of said rotor vanes tending to produce a vacuum between the same.

17. In an engine, the combination of rotor elements and piston elements driven independently but in coordination with each other and arranged in opposite pairs and aligned with each other on a common axis, means for taking power therefrom, and means whereby the actuation of any of the driving parts turns the opposite members of each pair in opposite directions.

18. A fluid pressure engine comprising a rotary driving element and a reciprocating driving element, with a common pressure chamber therefor, and means for varying the relative length of time of communication of said different driving elements with the pressure chamber in response to variations in speed.

19. An internal combustion engine comprising a rotary driving element and a reciprocating driving element with a common combustion chamber therefor, a valve controlling communication between said chamber and the rotary element, and means for varying the timing of the valve in response to variations in speed.

20. An internal combustion engine comprising a rotary driving element and a reciprocating driving element with means for variably distributing power between the said driving elements in response to variations in speed.

21. In an internal combustion engine, a cylinder, a recirocating piston working in said cylinder, a turbo-rotor surrounding and enclosing said cylinder with an air gap between them, an explosion chamber at one end of the cylinder with radial extensions to the turbo-rotor, means for admitting air to said air gap around the explosion chamber, and means on the turbo-rotor for drawing air through said air gap, whereby the combustion chamber, cylinder, and rotor are supplied with cooling air having a pressure and velocity proportionate to the speed.

22. An internal combustion engine as claimed in claim 21, having all of the units of cylinder, turbo-rotor and piston, doubled and assembled end to end, with the combustion chamber in common, the rotors being spaced apart in parallel planes, with radial extensions between them from the combustion chamber.

23. An internal combustion engine as claimed in claim 21, having all the units of cylinder, turbo-rotor and piston, doubled and assembled end to end, with the combustion chamber in common, the rotors being spaced apart in parallel planes, with radial extensions between them from the combustion chamber, and both rotors carrying means to suck air from their respective air spaces between cylinder and rotor.

24. An internal combustion engine as claimed in claim 21, having all the units of cylinder, turbo-rotor and piston, doubled and assembled end to end, with the combustion chamber in common, the rotors being spaced apart in parallel planes, with radial extensions between them from the combustion chamber, the two pairs, each composed of a connected piston and rotor, being geared to rotate in opposite directions so that every movable part of the engine has a duplicate part moving in the opposite direction.

In testimony whereof I affix my signature.

EDWARD E. CLEMENT.